(12) United States Patent
Kurita et al.

(10) Patent No.: US 7,595,895 B2
(45) Date of Patent: Sep. 29, 2009

(54) LASER BEAM MACHINING SYSTEM

(75) Inventors: Norio Kurita, Hamamatsu (JP); Tetsuya Osajima, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 10/585,825

(22) PCT Filed: Dec. 13, 2004

(86) PCT No.: PCT/JP2004/018590
§ 371 (c)(1),
(2), (4) Date: May 8, 2008

(87) PCT Pub. No.: WO2005/068126
PCT Pub. Date: Jul. 28, 2005

(65) Prior Publication Data
US 2008/0212063 A1    Sep. 4, 2008

(30) Foreign Application Priority Data
Jan. 13, 2004    (JP) .............................. 2004-005831

(51) Int. Cl.
*G01B 11/14*    (2006.01)
(52) U.S. Cl. ...................................... 356/614; 356/445
(58) Field of Classification Search ................ 356/3, 356/600–601, 445; 219/121.68, 121.81, 219/121.83, 121.84, 121.75; 359/634, 629
See application file for complete search history.

(56) References Cited

U.S. PATENT DOCUMENTS 5,042,950 A * 8/1991 Salmon, Jr. ................. 356/520
5,126,532 A * 6/1992 Inagawa et al. ........... 219/121.7

(Continued)

FOREIGN PATENT DOCUMENTS

JP    4-244910    9/1992

(Continued)

OTHER PUBLICATIONS

Hayashi, K. "Inner Glass Marking by Harmonics of Solid-State Laser", Proceedings of $45^{th}$ Laser Materials Processing Conference, Dec. 1998, pp. 23-28.

(Continued)

*Primary Examiner*—Sang Nguyen
(74) *Attorney, Agent, or Firm*—Drinker Biddle & Reath LLP (57) ABSTRACT

To provide a laser processing apparatus which can converge a laser beam for processing an object to be processed at a position as close as possible to a predetermined position.

This laser processing apparatus is one for irradiating an object to be processed with a processing laser beam while positioning a converging point within the object so as to form a modified region caused by multiphoton absorption within the object along a line along which, the object should be cut in the object, and comprises an objective lens unit 5 including a processing objective lens 42 which converges the processing laser beam and a rangefinding laser beam for measuring a displacement of a main surface of the object on an identical axis, a light-receiving part 45 which receives a reflected light beam of the rangefinding laser beam on the main surface, and an actuator 43 which holds the processing objective lens 42 according to the received reflected light beam such that the lens 42 is capable of freely advancing and retracting with respect to the main surface; and a housing 21 to which a laser unit for emitting the processing laser beam is attached. The objective lens unit 5 is detachably attached to the housing 21.

3 Claims, 4 Drawing Sheets

U.S. PATENT DOCUMENTS

| | | | | |
|---|---|---|---|---|
| 5,241,419 | A | * | 8/1993 | Pratt et al. .................. 359/634 |
| 5,268,554 | A | * | 12/1993 | Ream ...................... 219/121.8 |
| 5,334,816 | A | * | 8/1994 | Sugiyama .............. 219/121.83 |
| 5,382,770 | A | | 1/1995 | Black et al. |
| 5,744,780 | A | * | 4/1998 | Chang et al. ........... 219/121.73 |
| 6,144,010 | A | * | 11/2000 | Tsunemi et al. ........ 219/121.68 |
| 2006/0144828 | A1 | | 7/2006 | Fukumitsu et al. |

FOREIGN PATENT DOCUMENTS

| | | |
|---|---|---|
| JP | 06-344167 | 12/1994 |
| JP | 2000-009991 | 1/2000 |
| JP | 2000-084688 | 3/2000 |
| JP | 2002-219591 | 8/2002 |
| JP | 2003-225786 | 8/2003 |
| JP | 2004-337902 | 12/2004 |
| JP | 2004-337903 | 12/2004 |
| WO | 2004052586 | 6/2004 |

OTHER PUBLICATIONS

Miura, K. et al. "Formation of Photo-Induced Structures in Glasses with Femtosecond Laser", Proceedings of $42^{nd}$ Laser Materials Processing Conference, Nov. 1997, pp. 105-111.

Sano, T. et al. "Evaluation of Processing Characteristics of Silicon with Picosecond Pulse Laser", Preprints of the National Meeting of Japan Welding Society, No. 66, Apr. 2000, pp. 72-73 (with corresponding English-language translation).

* cited by examiner

LASER BEAM MACHINING SYSTEM

TECHNICAL FIELD

The present invention relates to a laser processing apparatus for processing an object to be processed by irradiating it with a laser beam.

BACKGROUND ART

Known as a conventional laser processing technique is one in which measurement means (a contact-type displacement meter, an ultrasonic rangefinder, or the like) for measuring the main surface height of the object to be processed is arranged in parallel with a condenser lens for converging a laser beam with a predetermined gap therebetween (see, for example, FIGS. 6 to 10 of Patent Document 1). In such a laser processing technique, while scanning the object with the laser beam along its main surface, the main surface height of the object is measured by the measurement means, and the condenser lens is driven along its optical axis such that the distance between the condenser lens and the main surface of the object becomes constant according to thus measured main surface at the time when the measurement point is positioned directly under the condenser lens. Patent Document 1: Japanese Patent Application Laid-Open No. 2002-219591

DISCLOSURE OF THE INVENTION

Problem to be Solved by the Invention

However, the following problem to be overcome exists in the above-mentioned laser processing apparatus disclosed in Patent Document 1. When the laser beam irradiation is started from a position on the outside of the object to be processed, so as to perform processing while the laser beam and the object are moved along the main surface of the latter, the measurement means proceeds with measurement from the outside of the object to the inside thereof. When the condenser lens is driven according to the measured value of main surface height obtained by this measurement, the converging point of the laser beam may deviate from its predetermined position in end parts of the object to be processed.

Therefore, it is an object of the present invention to provide a laser processing apparatus which can converge a laser beam for processing an object to be processed at a position which is as close as possible to a predetermined position.

Means for Solving Problem

Figure 4:
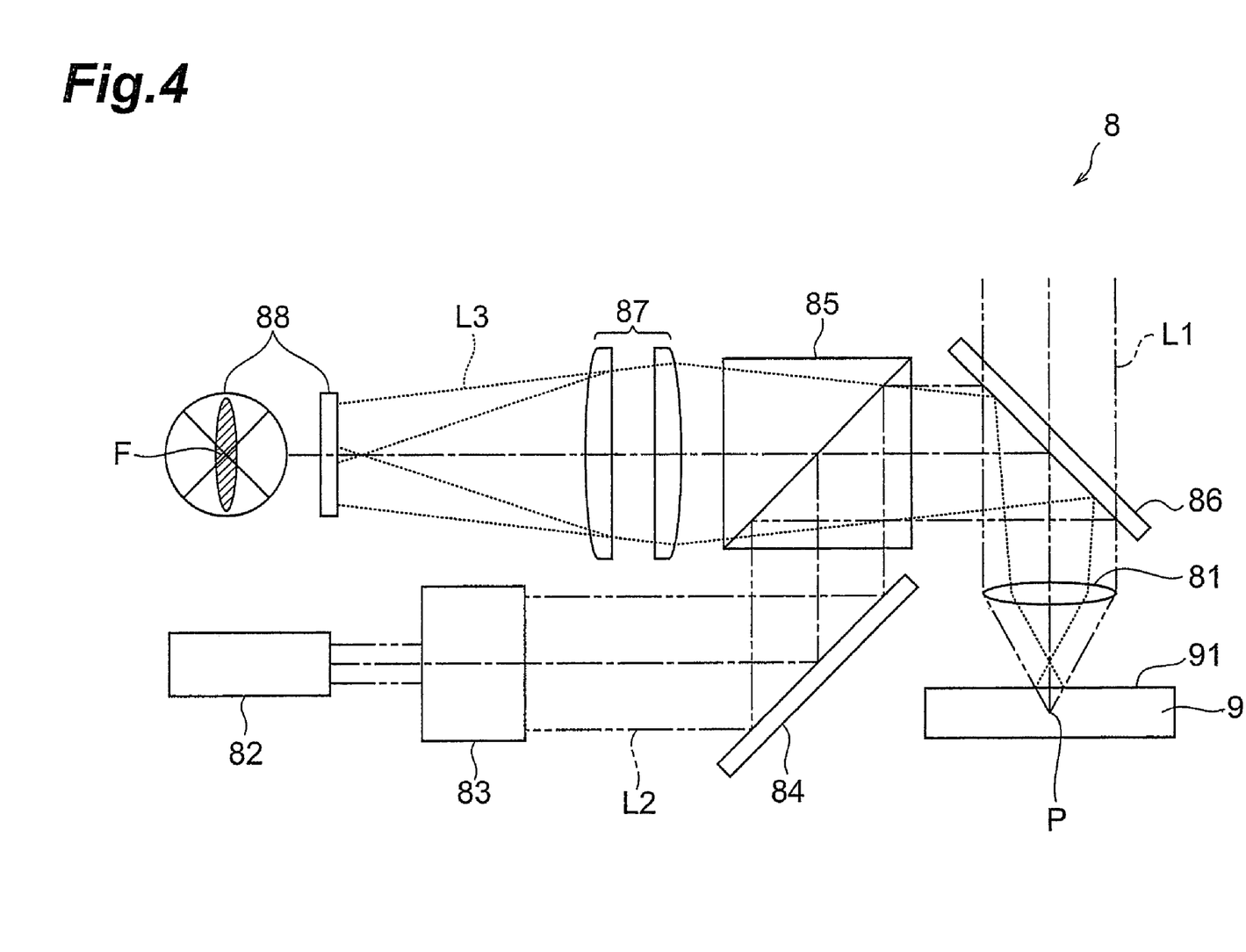
FIG. 4 is a view for explaining studies lead to the present invention.

The inventors conducted various studies in order to overcome the above-mentioned problem. First, a laser processing apparatus which emits a first laser beam for processing and a second laser beam for measuring the displacement of the main surface of an object to be processed on the same axis to the object was studied. FIG. 4 shows an outline of thus studied laser processing apparatus.

In the laser processing apparatus 8 shown in FIG. 4, a processing laser beam L1 is converged by a processing objective lens 81, such that a converging point P of the processing laser beam L1 is positioned at a predetermined depth from a surface 91 of an object 9 to be processed, so as to form a modified region. The processing objective lens 81 and the object 9 are moved relative to each other along the surface 91, so as to form the modified region along a predetermined line. Here, the surface 91 of the object 9 ideally has a high planarity, but may undulate in practice. For keeping the modified region at the predetermined depth from the surface 91 even when such an undulation exists, the processing objective lens 81 is held by a piezoelectric actuator (not depicted), which is expanded/contracted so as advance/retract the processing objective lens 81 along the optical axis of the processing laser beam L1. For driving the piezoelectric actuator in conformity to the undulation of the surface 91 of the object 9 as such, an astigmatism signal is used.

A method by which the laser processing apparatus 8 drives the piezoelectric actuator by utilizing an astigmatism signal will now be explained. A rangefinding laser beam L2 emitted from a rangefinding light source 82 which is a laser diode or the like passes through a beam expander 83, and is successively reflected by a mirror 84 and a half mirror 85, so as to be guided to a dichroic mirror 86. The rangefinding laser beam L2 reflected by the dichroic mirror 86 advances on the optical axis of the processing laser beam L1 downward in the drawing, and is converged by the processing objective lens 81, so as to irradiate the object 9. On the other hand, the processing laser beam L1 passes through the dichroic mirror 86.

A reflected light beam L3 of the rangefinding laser light L2 reflected by the surface 91 of the object 9 reenters the processing objective lens 81, and advances on the optical axis of the processing laser beam L1 upward in the drawing, so as to be reflected by the dichroic mirror 86. The reflected light beam L3 reflected by the dichroic mirror 86 passes through the half mirror 85, and is converged by a shaping optical system 87 composed of a cylindrical lens and a planoconvex lens, so as to irradiate a four-divided position detecting device 88 into which a photodiode is equally divided into four.

A focal image pattern F of the reflected light beam L3 converged on the four-divided position detecting device 88 acting as a light-receiving device varies depending on where the converging point of the rangefinding laser beam L2 due to the processing objective lens 81 is positioned with respect to the surface 91 of the object 9. Therefore, for indicating this focal image pattern F, an output signal (a difference between an output from light-receiving surfaces longitudinally opposing each other and an output from surfaces latitudinally opposing each other) from the four-divided position detecting device 88 may be used. According to this output signal, the position of the converging point of the rangefinding laser beam L2 with respect to the surface of the object 9 can be determined. Therefore, when the piezoelectric actuator (not depicted) is expanded/contracted according to this output signal, the processing objective lens 81 can be driven in conformity to the undulation of the surface 91 of the object 9.

When the laser processing apparatus 8 is used for cutting a semiconductor wafer or the like, the laser driving time becomes longer. Because of lives of parts of the processing objective lens 81 and piezoelectric actuator (not depicted), needs for replacing these parts occur. Since the processing laser beam L1 and rangefinding laser beam L2 are converged onto the object 9 on the same axis, not only the processing laser beam L1 but also the rangefinding laser beam L2 is required to be centered when replacing the processing objective lens 81. For centering the rangefinding laser beam L2, it is necessary to regulate a rangefinding optical system constituted by the rangefinding light source 82, beam expander 83, mirror 84, half mirror 85, dichroic mirror 86, shaping optical system 87, four-divided position detecting device 88, etc., which is assumed to be troublesome. Hence, the inventors have achieved the present invention in order to overcome this new problem found in the process of the study mentioned above.

In one aspect, the present invention provides a laser processing apparatus for irradiating an object to be processed with a first laser beam so as to process the object, the apparatus comprising a processing unit including a lens for converging the first laser beam and a second laser beam for measuring a displacement of a main surface of the object to the object on an identical axis, light-receiving means for receiving a reflected light beam on the main surface of the object, and holding means for holding the lens according to the received reflected light beam such that the lens is capable of freely advancing and retracting with respect to the main surface; and a housing part including a laser unit for emitting the first laser beam; wherein the processing unit is detachably attached to the housing part.

Since the processing unit is detachably attached to the housing part in the laser processing apparatus in accordance with this aspect of the present invention, the whole processing emit can be replaced if its components fail, for example. Since the processing unit includes the lens and light-receiving means, the processing unit attached to the housing part enables centering adjustment when the axis of the first laser beam in the housing part is aligned with the axis of the second laser beam in the processing unit.

Preferably, the laser processing apparatus in accordance with this aspect of the present invention is configured such that the housing part includes an observation optical system, whereas the observation optical system is adapted to emit an observation visible ray to the object on the same axis as with the first and second laser beams and observe a reflected light beam reflected by the main surface of the object in response to the emission. Since the laser processing apparatus is configured such as to be able to emit the observation visible ray to the object on the same axis as with the first laser beam and observe the reflected light beam of the observation visible ray, the distance between the lens and the object can be adjusted according to the observation visible ray.

Preferably, in the laser processing apparatus in accordance with this aspect of the present invention, the housing part includes an attachment panel extending along the axis of the first and second laser beams, the processing unit being detachably attached to a main surface of the attachment panel, the attachment panel and the processing unit being positioned with respect to each other by inserting a projection protruding from one of the attachment panel and processing unit into a hole formed in the other. Since the processing unit is attached to the attachment panel extending along the axis of the first and second laser beams, the processing unit can be restrained from moving about the axis. Since the attachment panel and the processing unit are positioned by inserting the projection into the hole, an operation of attaching the processing unit at an accurate position becomes easier.

In another aspect, the present invention provides a laser processing apparatus comprising a housing part including a first laser light source for emitting a first laser beam for processing an object to be processed; and a processing unit including a second laser light source for emitting a second laser beam for measuring a displacement of a main surface of the object, light-receiving means for receiving the second laser beam emitted from the second laser light source, a processing unit housing for accommodating the second laser light source and light-receiving means therein, and a lens for converging the first and second laser beams onto the object on an identical axis, the lens being secured to an outer peripheral face of the processing unit housing by way of holding means; wherein the processing unit is detachably attached to the housing part.

Since the processing unit is detachably attached to the housing part in the laser processing apparatus in accordance with this aspect of the present invention, the whole processing unit can be replaced if components such as the second laser light source and light-receiving means included in the processing unit fail, for example. Since the processing unit includes the lens and light-receiving means, the processing unit attached to the housing part enables centering adjustment when the axis of the first laser beam in the housing part is aligned with the axis of the second laser beam in the processing unit.

Preferably, in the laser processing apparatus in accordance with this aspect of the present invention, the housing part is formed with a first laser passing part for passing therethrough the first laser beam at a position in contact with the processing unit along the axis, whereas the processing unit housing is formed with a second laser passing part for passing therethrough the first laser beam at a position in contact with the housing part along the axis, and a third laser passing part for passing therethrough the first and second laser beams at a position opposing the lens along the axis. Since the first, second, and third laser passing parts and the lens are arranged along a predetermined axis, the housing part and the processing unit can be disposed such that the first laser beam passes through the housing part and processing unit housing so as to reach the lens if the processing unit is attached to the housing part.

Effect of the Invention

The laser processing apparatus in accordance with the present invention can converge a laser beam for processing an object to be processed at a position which is as close as possible to a predetermined position. When replacing the lens or light-receiving means, it becomes easier to converge first and second laser beams onto the object while aligning their optical axes with each other on the same axis. When the object to be processed is shaped like a wafer, for example, there is a case where the inside of the wafer-like object is irradiated with a laser, so as to form a modified layer, and the object is cleaved from thus formed modified layer. For improving the quality and precision of cleavage in this case, it is important to irradiate a laser at a predetermined depth position precisely. Employing the present invention in such processing enables precise setting when maintaining the laser processing apparatus.

EXPLANATIONS OF NUMERALS

1 . . . laser processing apparatus, 2 . . . stage, 3 . . . laser head unit, 4 . . . optical system main part, 5 . . . objective lens unit, 6 . . . laser emitting apparatus, 7 . . . control unit, S . . . object, R . . . modified region, 42 . . . processing objective lens, 43 . . . actuator, 13 . . . laser head, 44 . . . laser diode, 45 . . . light-receiving part.

BEST MODES FOR CARRYING OUT THE INVENTION

The findings of the present invention can easily be understood in view of the following detailed descriptions with reference to the accompanying drawings, which are given by way of illustration only. An embodiment of the present invention will now be explained with reference to the accompanying drawings. When possible, parts identical to each other will be referred to with numerals identical to each other without repeating their overlapping explanations.

Figure 1:
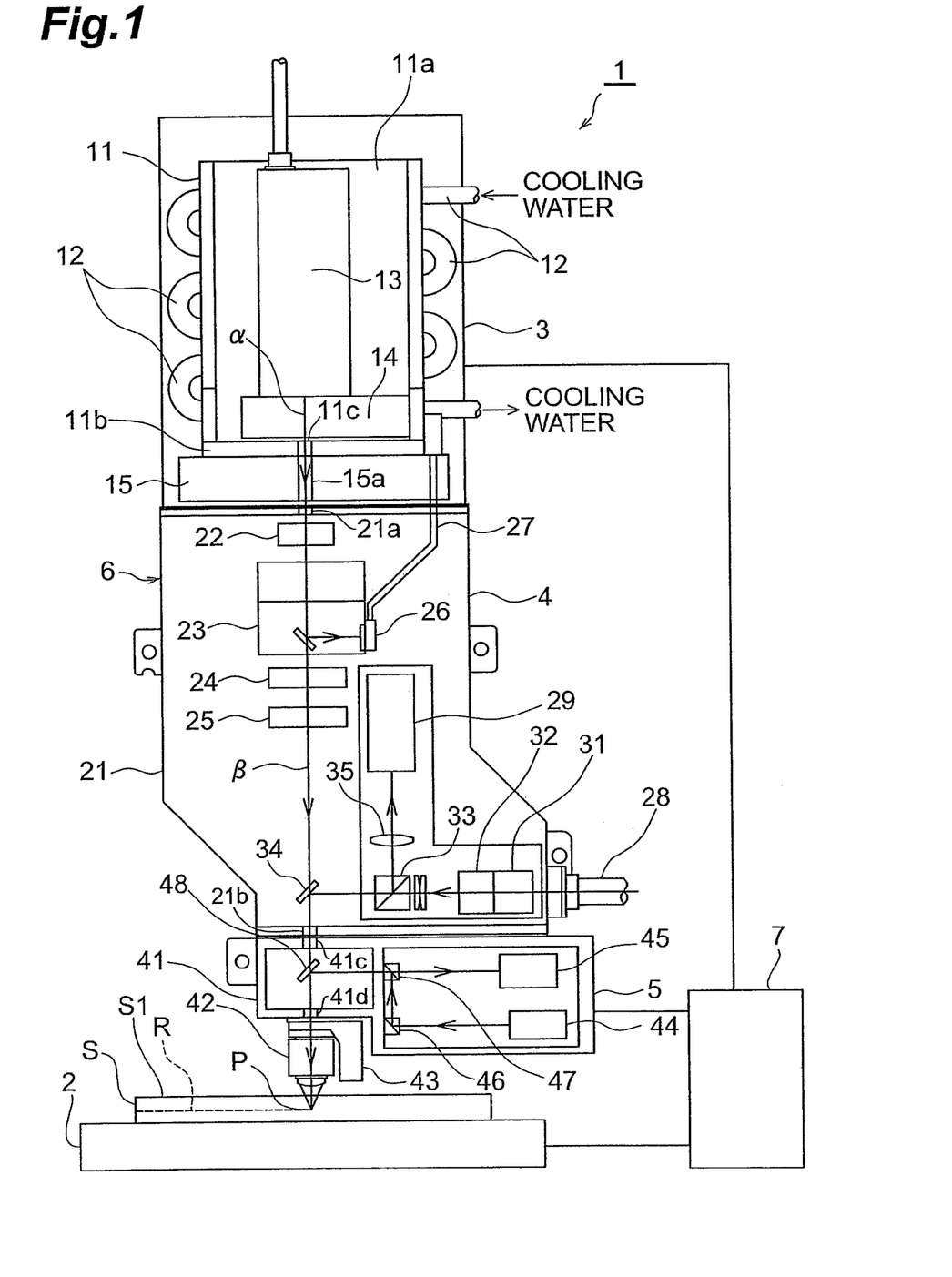
FIG. 1 is a view showing the configuration of the laser processing apparatus in accordance with an embodiment of the present invention.

The laser processing apparatus in accordance with an embodiment of the present invention will be explained with reference to FIG. 1. As shown in FIG. 1, this laser processing apparatus 1 is an apparatus which irradiates a planar object S to be processed mounted on a stage 2 with a processing laser beam L1 (first laser beam) while positioning a converging point P within the object S, so as to form a modified region R caused by multiphoton absorption within the object S. The stage 2 is movable up/down and left/right and rotatable. Disposed above the stage 2 is a laser emitting apparatus 6 mainly constituted by a laser head unit 3 (a laser unit and a housing part), an optical system main part 4 (the housing part), and an objective lens unit 5 (a processing unit). The laser processing apparatus 1 also comprises a control unit 7. To the stage 2 and laser emitting apparatus 6, the control unit 7 outputs control signals for regulating their behaviors (the movement of the stage 2, the laser beam emission from the laser emitting apparatus 6, etc.).

The laser head unit 3 is detachably attached to an upper end part of the optical system main part 4. The laser head unit 3 includes an L-shaped cooling jacket 11. Embedded in a vertical wall 11a of the cooling jacket 11 is a cooling pipe 12 in a winding state, through which cooling water circulates. Attached to the front face of the vertical wall 11a are a laser head 13 which emits the processing laser beam L1 downward, and a shutter unit 14 for selectively opening and closing an optical path of the processing laser beam L1 emitted from the laser head 13. This can prevent the laser head 13 and shutter unit 14 from overheating. For example, the laser head 13 uses an Nd:YAG laser and emits a pulsed laser beam having a pulse width of 1 μs or shorter as the processing laser beam L1.

In the laser head unit 3, an adjuster 15 for adjusting the inclination of the cooling jacket 11 and the like is attached to the lower face of a bottom wall 11b of the cooling jacket 11. The adjuster 15 is used for aligning an optical axis α of the processing laser beam L1 emitted from the laser head 11 with an axis β which is set in the optical axis main part 4 and objective lens unit 5 such as to extend vertically. Namely, the laser head unit 3 is attached to the optical system main part 4 by way of the adjuster 15. When the inclination of the cooling jacket 11 or the like is adjusted by the adjuster 15, the inclination of the laser head 13 or the like is adjusted in conformity to the movement of the cooling jacket 11. As a consequence, the processing laser beam L1 advances into the optical system main part 4 while in a state where its optical axis optical axis α coincides with the axis β. The bottom wall 11b of the cooling jacket 11, the adjuster 15, and a housing 21 of the optical system main part 4 are formed with through holes 11c, 15a, 21a, and 21b (first laser passing part), through which the processing laser beam L1 passes.

On the axis β within the housing 21 of the optical system main part 4, a beam expander 22 for enlarging the beam size of the processing laser beam L1 emitted from the laser head 13, an optical attenuator 23 for adjusting the output of the processing laser beam L1, an output observation optical system 24 for observing the output of the processing laser beam L1 adjusted by the optical attenuator 23, and a polarization adjusting optical system 25 for adjusting the polarization of the processing laser beam L1 are arranged in this order from the upper side to the lower side. A beam damper 26 for absorbing the eliminated laser beam is attached to the optical attenuator 23, and is connected to the cooling jacket 11 by way of a heat pipe 27. This can prevent the beam damper 26 having absorbed the laser beam from overheating.

For observing the object S mounted on the stage 2, a light guide 28 for guiding an observation visible ray is attached to the housing 21 of the optical system main part 4, whereas a CCD camera 29 is disposed within the housing 21. The observation visible ray is guided by the light guide 28 into the housing 21, successively passes through a field stop 31, a reticle 32, a dicliroic mirror 33, and the like, and then is reflected by a dichroic mirror 34 disposed on the axis β. The reflected observation visible ray advances downward on the axis β and irradiates the object S. On the other hand, the processing laser beam L1 is transmitted through the dichroic mirror 34.

The reflected light beam of the observation visible ray reflected by a surface S1 of the object S advances upward on the axis β, and is reflected by the dichroic mirror 34. The light beam reflected by the dichroic mirror 34 is further reflected by the dichroic mirror 33, so as to pass through an imaging lens 35, etc., thereby entering the CCD camera 29. An image of the object S captured by the CCD camera 29 is displayed on a monitor (not depicted). The system through which the observation visible ray is guided before entering the CCD camera 29 is a mode embodying the observation optical system of the present invention.

The objective lens unit 5 is detachably attached to the lower end part of the optical system main part 4. Since the objective lens unit 5 is positioned by a plurality of positioning pins with respect to the lower end part of the optical system main part 4, the axis β set in the optical system main part 4 and the axis β set in the objective lens unit 5 can easily be aligned with each other. By way of an actuator 43 (holding means) using a piezoelectric device, a processing objective lens 42 is mounted to the lower end of the housing 41 of the objective lens unit 5 while in a state where the optical axis coincides with the axis β. The housing 21 of the optical system main part 4 and the housing 41 of the objective lens unit 5 are formed with through holes 21a, 21b, 41c (second laser passing part), and 41d (third laser passing part), through which the processing laser beam L1 passes. The peak power density of the processing laser beam L1 converged by the processing objective lens 42 is at least $1 \times 10^8$ (W/cm$^2$) at the converging point P.

In order to position the converging point P of the processing laser beam L1 at a predetermined depth from the surface S1 of the object S, a laser diode 44 for emitting a rangefinding laser beam L2 (second laser beam) and a light-receiving part 45 (light-receiving means) are disposed within the housing 41 of the objective lens unit 5. The rangefinding laser beam L2 is emitted from the laser diode 44, and is successively reflected by a mirror 46 and a half mirror 47, and then by a dichroic mirror 48 disposed on the axis β. The reflected rangefinding laser beam L2 advances downward on the axis β, passes through the through hole 41d and then through the processing objective lens 42 mounted at a position opposing the through hole 41d, thereby irradiating the surface S1 of the object S. On the other hand, the processing laser beam L1 passes through the dichroic mirror 48.

The reflected light beam of the rangefinding laser beam L2 reflected by the surface S1 of the object S reenters the processing objective lens 42, and advances upward on the axis β, so as to be reflected by the dichroic mirror 48. The reflected light beam of the rangefinding laser beam L2 reflected by the dicliroic mirror 48 passes through the half mirror 47, so as to enter the light-receiving part 45, and is converged on a four-divided position detecting device in which a photodiode is equally divided into four. According to the converged image pattern of the reflected light beam of the rangefinding laser beam L2 converged onto the four-divided position detecting device, it can be detected where the converging point of the rangefinding laser beam L2 due to the processing objective lens 42 is positioned with respect to the surface S1 of the object S. Information about the converged image pattern of the reflected light beam of the rangefinding laser beam L2 converged on the four-divided position detecting device is outputted to the control unit 7. According to this information, the control unit 7 outputs a control signal for indicating to the actuator 43 a position for holding the processing objective lens 42.

An outline of a laser processing method carried out by thus configured laser processing apparatus 1 will now be explained. First, the object S is mounted on the stage 2, and the stage 2 is moved such that the converging point P of the processing laser beam L1 is positioned within the object S. The initial position of the stage 2 is determined by the thickness and refractive index of the object S, the numerical aperture of the processing objective lens 42, etc.

Subsequently, the processing laser beam L1 is emitted from the laser head 13, the rangefinding laser beam L2 is emitted from the laser diode 44, and the stage 2 is moved such that the processing laser beam L1 and rangefinding laser beam L2 converged by the processing objective lens 42 scan a desirable line (line along which the object should be cut) of the object S. Here, the light-receiving part 45 detects the reflected light beam of the rangefinding laser beam L2, and the control unit 7 controls the actuator 43 in a feedback fashion such that the converging point P of the processing laser beam L1 is always positioned at a predetermined depth from the surface S1 of the object S, whereby the position of the object lens 42 is minutely adjusted along the axis $\beta$.

Therefore, even when the surface S1 of the object S wobbles, for example, a modified region R caused by multiphoton absorption can be formed at a position located at a predetermined depth from the surface S1. Forming the linear modified region R within the planar object S as such can generate a cleavage from the linear modified region R acting as a start point, whereby the object S can be cut easily with a high precision along the linear modified region R.

Figure 2:
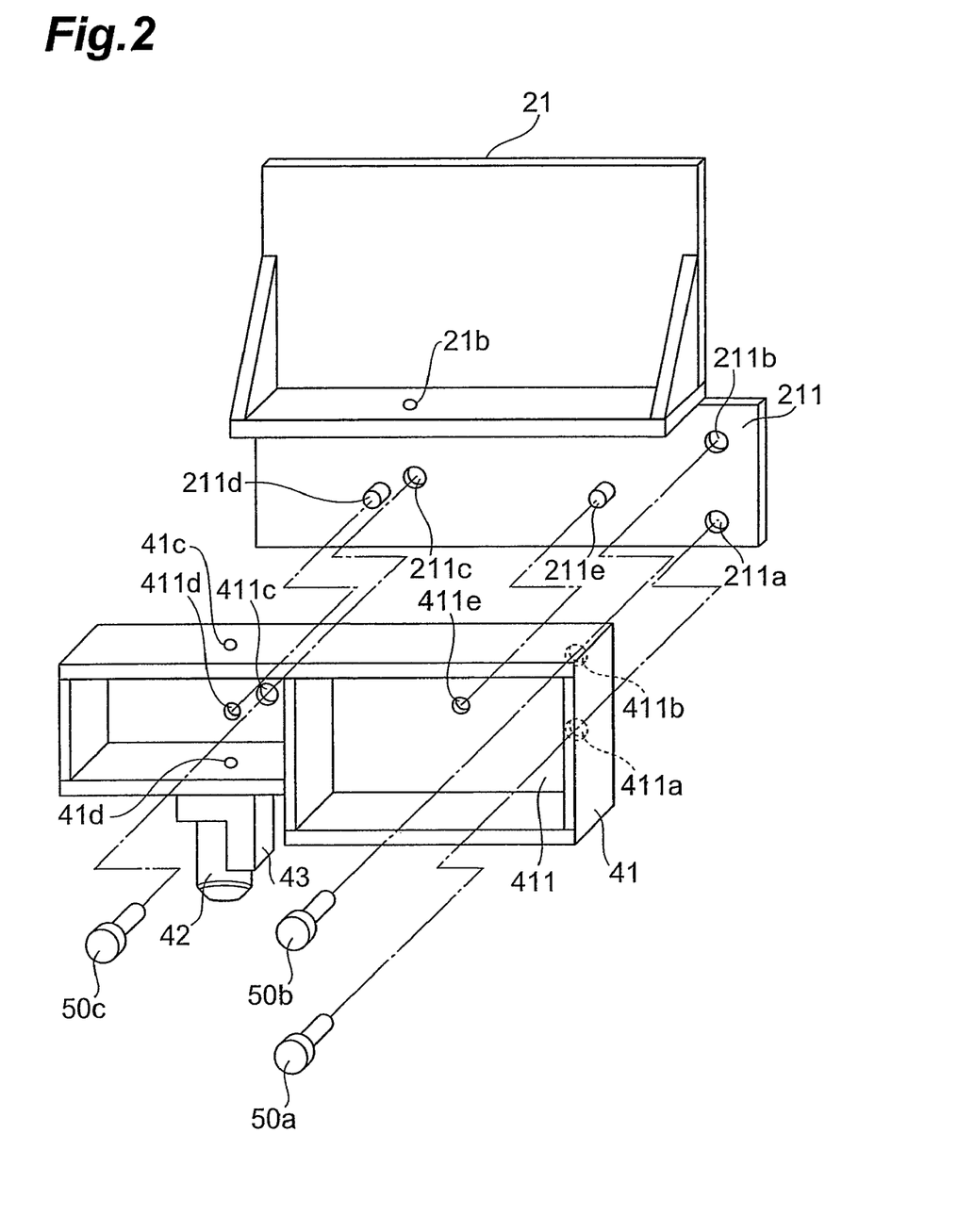
FIG. 2 is a view showing a state where an objective lens unit of FIG. 1 is being attached to a main part of an optical system.

The part where the objective lens unit 5 is attached to the optical system main part 4 will now be explained with reference to FIG. 2. For easier understanding, the components contained within the housing 41 of the objective lens unit 5 are omitted in FIG. 2.

An attachment panel 211 is attached to the bottom part of the optical system main part 4 along the axis $\beta$ (see FIG. 1). The attachment panel 211 is provided with projections 211$d$ and 211$e$ protruding therefrom. The attachment panel 211 is also formed with screw holes 211$a$, 211$b$, and 211$c$.

The housing 41 of the objective lens unit 5 includes a rear panel 411, which comes into contact with the attachment panel 211, whereby the objective lens unit 5 is secured to the housing 21. The rear panel 411 is formed with holes 411$a$, 411$b$, 411$c$, 411$d$, and 411$e$.

The objective lens unit 5 is brought into contact with the attachment panel 211 such that the projections 211$d$ and 211$e$ of the attachment panel 211 are inserted into the holes 411$d$ and 411$e$ of the objective lens unit 5, respectively. Since the attachment panel 211 is formed so as to extend along the axis $\beta$ (see FIG. 1), the objective lens unit 5 is restrained from moving about the axis $\beta$. Also, since the projections 211$d$ and 211$e$ are inserted into the holes 411$d$ and 411$e$, respectively, so as to be positioned, the objective lens unit 5 is restrained from moving in a plane extending along the attachment panel 211. Therefore, the objective lens unit 5 can be placed such that the axis $\beta$ aligns with the processing objective lens 42.

When the objective lens unit 5 is brought into contact with the attachment panel 211, the holes 411$a$, 411$b$, 411$c$ of the holes of the objective lens unit 5 and the screw holes 211$a$, 211$b$, 211$c$ of the attachment panel 211 are placed at respective positions corresponding to each other. Here, screws 50$a$, 50$b$, 50$c$ are inserted from the holes 411$a$, 411$b$, 411$c$ of the objective lens unit 5, respectively, and are fastened, whereby the objective lens unit 5 is secured to the housing 21.

Figure 3:
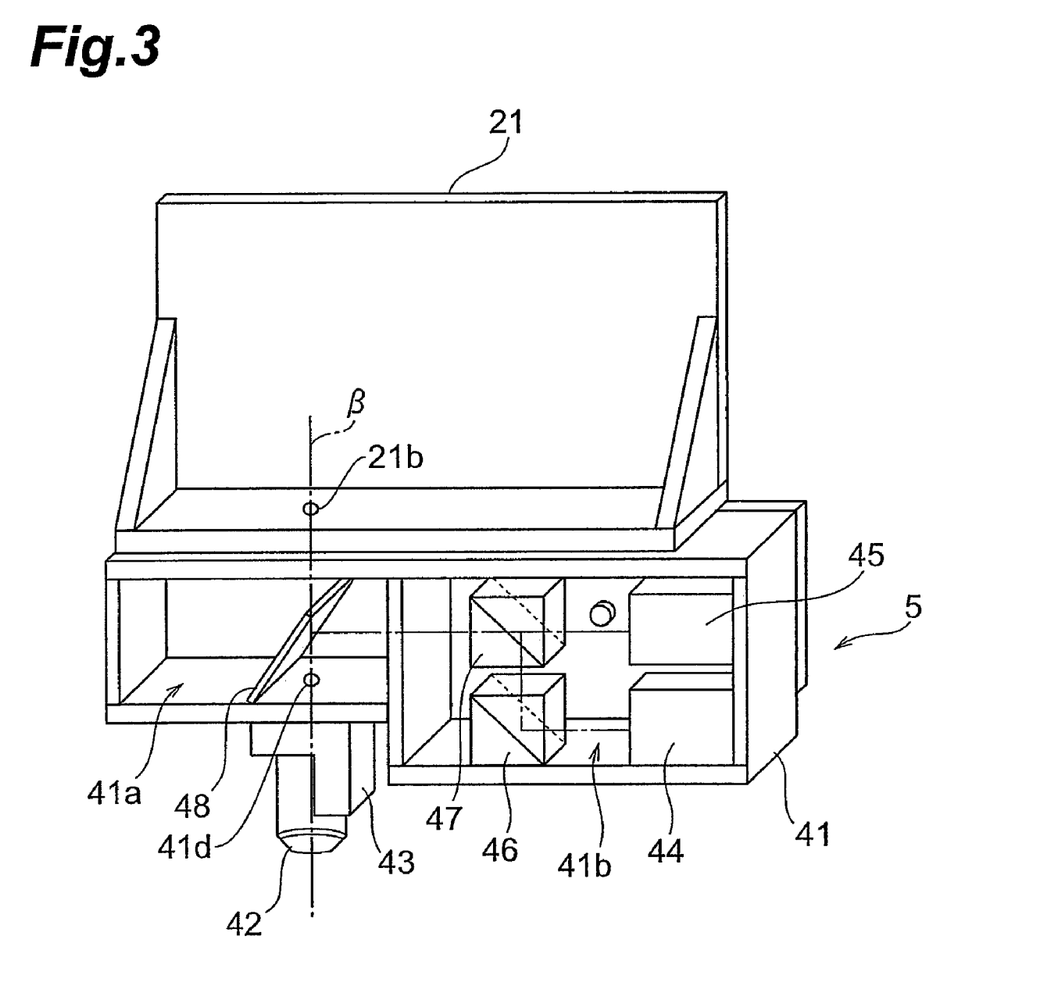
FIG. 3 is a view showing a state where the objective lens unit of FIG. 1 is attached to the main part of the optical system.

FIG. 3 shows a state where the objective lens unit 5 is secured to the housing 21. The objective lens unit 5 is constituted by a first part 41$a$ to which the processing objective lens 42 is attached by way of the actuator 43, and a second part 41$b$ accommodating a rangefinding optical system composed of the laser diode 44, light-receiving part 45, mirror 46, and half mirror 47.

As explained above, the rangefinding laser beam L2 emitted from the laser diode 44 is successively reflected by the mirror 46 and the half mirror 47, and then by the dichroic mirror 48 disposed in the first part 41$a$. The dichroic mirror 48 is arranged so as to be positioned on the axis $\beta$. Therefore, the rangefinding laser beam L2 reflected by the dichroic mirror 48 advances on the axis $\beta$ downward in the drawing, so as to pass through the processing objective lens 42, thereby irradiating the surface S1 of the object S.

The reflected light beam of the rangefinding laser beam L2 reflected by the surface S1 of the object S reenters the processing objective lens 42, so as to advance on the optical system upward in the drawing, and then is reflected by the dichroic mirror 48. The reflected light beam of the rangefinding laser beam L2 reflected by the dichroic mirror 48 passes through the light-receiving part 47 and enters the light-receiving part 45, so as to be converged on a four-divided position detecting device in which a photodiode is equally divided into four.

Since the individual components are arranged such that the rangefinding laser beam L2 enters by way of the mirror 46, half mirror 47, and dichroic mirror 48 in succession in this embodiment, no minute adjustment of the rangefinding optical system is necessary even when the objective lens unit 5 is replaced. Also, since this embodiment is configured such that the objective lens unit 5 is positioned at a predetermined location when being attached to the housing 21 of the optical system main part 4, the processing objective lens 42 and dichroic mirror 48 can be arranged so as to be positioned on the axis $\beta$.

INDUSTRIAL APPLICABILITY

The laser processing apparatus in accordance with the present invention can converge a laser beam for processing an object to be processed at a position which is as close as possible to a predetermined position. When replacing the lens or light-receiving means, it becomes easier to converge first and second laser beams onto the object while aligning their optical axes with each other on the same axis. When the object to be processed is shaped like a wafer, for example, there is a case where the inside of the wafer-like object is irradiated with a laser, so as to form a modified layer, and the object is cleaved from thus formed modified layer. For improving the quality and precision of cleavage in this case, it is important to irradiate a laser at a predetermined depth position precisely. Employing the present invention in such processing enables precise setting when maintaining the laser processing apparatus.

The invention claimed is:

1. A laser processing apparatus for irradiating an object to be processed with a first laser beam so as to process the object, the apparatus comprising:

a housing part including a laser unit which is a first laser light source for emitting the first laser beam; and a processing unit being detachably attached to the housing part, wherein the processing unit including a second laser light source for emitting a second laser beam for measuring a displacement of a main surface of the object, a lens for converging the first laser beam and the second laser beam onto the object, a dichroic mirror by which the first laser beam and the second laser beam are made incident to the lens on an identical axis, light-receiving means for receiving a reflected light beam which is the second laser beam reflected on the main surface of the object, and an actuator for holding the lens according to the reflected light beam received by the light-receiving means such that the lens is capable of freely advancing and retracting with respect to the main surface, wherein the actuator is secured to a processing unit housing for accommodating the second laser light source, the dichroic mirror and the light-receiving means therein, wherein the housing part includes an observation optical system, the observation optical system being adapted to emit an observation visible ray to the object on the axis and observe a reflected light beam reflected by the main surface of the object in response to the emission, and wherein the second laser beam is reflected by the dichroic mirror, and the first laser beam passes through the dichroic mirror.

2. A laser processing apparatus according to claim 1, wherein the housing part includes an attachment panel extending along the axis, the processing unit being detachably attached to a main surface of the attachment panel, the attachment panel and the processing unit being positioned with respect to each other by inserting a projection protruding from one of the attachment panel and processing unit into a hole formed in the other.

3. A laser processing apparatus according to claim 1, wherein the housing part is formed with a first laser passing part for passing therethrough the first laser beam at a position in contact with the processing unit along the axis, and wherein the processing unit housing is formed with a second laser passing part for passing therethrough the first laser beam at a position in contact with the housing part along the axis, and a third laser passing part for passing therethrough the first and second laser beams at a position opposing the lens along the axis.

* * * * *